United States Patent
Moore et al.

(10) Patent No.: US 10,936,823 B2
(45) Date of Patent: Mar. 2, 2021

(54) METHOD AND SYSTEM FOR DISPLAYING AUTOMATED AGENT COMPREHENSION

(71) Applicant: International Business Machines Corporation, Armonk, NY (US)

(72) Inventors: Robert J. Moore, San Jose, CA (US); Raphael Arar, Santa Cruz, CA (US); Guangjie Ren, Belmont, CA (US); Margaret H. Szymanski, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 164 days.

(21) Appl. No.: 16/175,647

(22) Filed: Oct. 30, 2018

(65) Prior Publication Data
US 2020/0134021 A1    Apr. 30, 2020

(51) Int. Cl.
*G06F 17/27* (2006.01)
*G06F 40/30* (2020.01)
*G06F 3/0484* (2013.01)
*G06F 40/295* (2020.01)

(52) U.S. Cl.
CPC .......... *G06F 40/30* (2020.01); *G06F 3/0484* (2013.01); *G06F 40/295* (2020.01)

(58) Field of Classification Search
None
See application file for complete search history.

(56) References Cited

U.S. PATENT DOCUMENTS

| | | | |
|---|---|---|---|
| 6,572,431 B1* | 6/2003 | Maa | A63H 3/28 369/63 |
| 9,014,661 B2* | 4/2015 | deCharms | H04W 4/021 455/404.2 |
| 9,820,120 B2* | 11/2017 | deCharms | H04W 4/021 |
| 10,019,670 B2* | 7/2018 | Gilbert | G06N 5/02 |
| 10,154,389 B2* | 12/2018 | Shan | H04W 4/08 |
| 2008/0134038 A1* | 6/2008 | Oh | G06F 16/9535 715/727 |
| 2010/0313119 A1 | 12/2010 | Baldwin et al. | |
| 2012/0047135 A1 | 2/2012 | Hansson et al. | |
| 2014/0122407 A1 | 5/2014 | Duan | |
| 2015/0081653 A1 | 3/2015 | Hsu et al. | |
| 2016/0055240 A1 | 2/2016 | Tur et al. | |
| 2016/0148610 A1 | 5/2016 | Kennewick, Jr. | |
| 2016/0314194 A1 | 10/2016 | Hood et al. | |
| 2018/0131645 A1* | 5/2018 | Magliozzi | G06F 40/30 |
| 2019/0222540 A1* | 7/2019 | Relangi | G06Q 30/01 |
| 2020/0065873 A1* | 2/2020 | Ruvini | G06F 16/31 |
| 2020/0097247 A1* | 3/2020 | Molina | G06F 3/167 |

* cited by examiner

*Primary Examiner* — Satwant K Singh
(74) *Attorney, Agent, or Firm* — Sherman IP LLP; Kenneth L. Sherman; Hemavathy Perumal

(57) ABSTRACT

One embodiment provides a method comprising generating a conversational interface for display on an electronic device. The conversational interface facilitates a communication session between a user and an automated conversational agent. The method further comprises performing a real-time analysis of a portion of a user input in response to the user constructing the user input during the communication session, and updating the conversational interface to include real-time feedback indicative of whether the automated conversational agent understands the portion of the user input based on the analysis. The real-time feedback allows the user to adjust the user input before completing the user input.

20 Claims, 8 Drawing Sheets

Hello James, I'm Watson.
I can make recommendations
if you tell me a little bit about
your trip.

510

530

520  Show  531

Hello James, I'm Watson.
I can make recommendations
if you tell me a little bit about
your trip.

Show me
Request   540

Hello James, I'm Watson.
I can make recommendations
if you tell me a little bit about
your trip.

Show me flights to
Request: flight

Hello James, I'm Watson.
I can make recommendations
if you tell me a little bit about
your trip.

Show me flights to Rome
Request: flight, Rome

Hello James, I'm Watson.
I can make recommendations
if you tell me a little bit about
your trip.

Show me flights to Rome and hotels
Request: flight, request: hotels, Rome

METHOD AND SYSTEM FOR DISPLAYING AUTOMATED AGENT COMPREHENSION

The present invention generally relates to conversational systems, and more particularly, to a method and system for displaying automated agent comprehension.

BACKGROUND

A conversational system or a conversational agent (also known colloquially as a chatbot) is a computer system intended to converse with a human with a coherent structure. Conversational systems have employed text, speech, graphics, haptics, gestures, and other modes for communication.

SUMMARY

One embodiment provides a method comprising generating a conversational interface for display on an electronic device. The conversational interface facilitates a communication session between a user and an automated conversational agent. The method further comprises performing a real-time analysis of a portion of a user input in response to the user constructing the user input during the communication session, and updating the conversational interface to include real-time feedback indicative of whether the automated conversational agent understands the portion of the user input based on the analysis. The real-time feedback allows the user to adjust the user input before completing the user input.

These and other aspects, features and advantages of the invention will be understood with reference to the drawing figures, and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 4 illustrates a sequence of updates to a first example conversational interface generated by the conversational system, in accordance with one embodiment of the invention;

Figure 1:
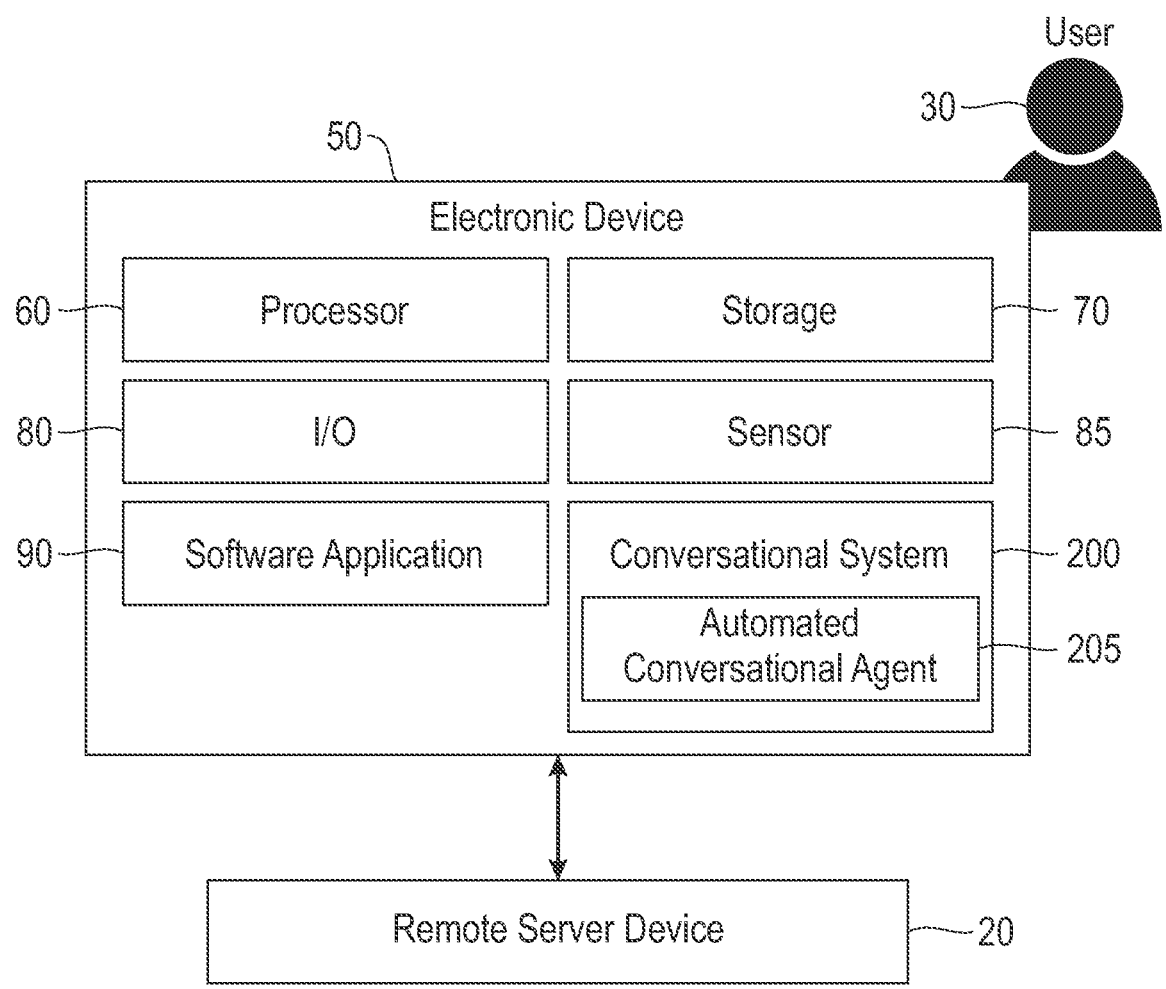
FIG. 1 illustrates a first example computing architecture for classify-as-you-go automated agent comprehension, in accordance with an embodiment of the invention.

The detailed description explains the preferred embodiments of the invention, together with advantages and features, by way of example with reference to the drawings.

DETAILED DESCRIPTION

The present invention generally relates to conversational systems, and more particularly, to a method and system for matching entities using visual information. One embodiment provides a method comprising generating a conversational interface for display on an electronic device. The conversational interface facilitates a communication session between a user and an automated conversational agent. The method further comprises performing a real-time analysis of a portion of a user input in response to the user constructing the user input during the communication session, and updating the conversational interface to include real-time feedback indicative of whether the automated conversational agent understands the portion of the user input based on the analysis. The real-time feedback allows the user to adjust the user input before completing the user input.

For expository purposes, the term "utterance" as used herein refers to user input from a user (i.e., a human), wherein the user input comprises a sequence of one or more words, and the user input is provided as either speech (i.e., the user speaks the utterance) or text (i.e., the user types/enters the text). In this specification, utterances encompass any kind of conversational action or intent from users such as, but not limited to, requests, inquiries, acknowledgments, appreciation, stories, aborts, etc.

One limitation of a conversational interface provided by a conventional conversational system is that a user receives no feedback about whether or not the conversational system is understanding the user's utterances while the user is constructing/producing the utterances (i.e., the user is speaking of typing the utterance). Typically, the user only receives feedback as to whether the conversational system has understood the user's utterances after the user has completed the utterances (e.g., after the user has finished speaking or typing).

By contrast, a human recipient analyzes, in real-time, a user's utterances as the user is speaking. The human recipient may provide verbal and non-verbal feedback (e.g., verbal cues, facial cues, hand gestures, etc.) as the utterances unfold. For example, the human recipient may interrupt the user as the utterances unfold, or the human recipient may provide an appropriate response precisely at an end of a current utterance without any gap or overlap. Any verbal or non-verbal cue or feedback provided during the production of the utterances enables the user to modify his/her utterances mid-course, such as increasing clarity or attractiveness of the utterances, thereby tailoring the utterances to the situation. The ability for the user to receive real-time feedback as the utterances unfold enables increased efficiency and flexibility compared to communications with no real-time feedback, such as standard text messaging.

Table 1 below provides an example transcript of a communication session between a user and an automated conversational agent (i.e., a chatbot) implemented by a conventional conversational system.

TABLE 1

User: Who invented the graphical user interface?
Automated conversational agent: I'm sorry, I don't understand. I can look up hotels and flights.

As shown in Table 1, the automated conversational agent does not provide real-time feedback during construction/production of the user's utterance (i.e., as the utterance unfolds). Instead, the automated conversational agent provides feedback only after the entire utterance is complete (i.e., after the user stops speaking).

Table 2 below provides an example transcript of a communication session between a user and a human agent (i.e., a human recipient).

TABLE 2

User: Who invented the *
Human Agent: Sorry, I can only look up hotels and flights.

* denotes a point in time during the user's utterance when the human agent interrupts the user As shown in Table 2, the human agent provides real-time feedback indicative of whether the human agent understands the user while the user is still constructing an utterance (i.e., while the utterance unfolds). This enables the user to adjust the utterance based on the real-time feedback provided, thereby increasing efficiency and flexibility.

One or more embodiments of the invention provide a conversational system that implements classify-as-you-go automated agent comprehension in which an automated conversational agent analyzes an utterance of a user as the utterance unfolds (i.e., as the user constructs the utterance) and provides real-time feedback as the utterance unfolds. Specifically, after each word of the utterance, the automated conversational agent performs an analysis of all words the user has provided so far ("utterance-so-far") and provides real-time feedback based on the analysis. In one embodiment, the real-time feedback is indicative of whether the automated conversational agent understands the utterance-so-far or can successfully execute the utterance-so-far. The real-time feedback provided enables the user to see how well the automated conversational agent is understanding the user in real-time as the user constructs the utterance, enabling the user to adapt accordingly. This is unlike conventional conversational systems that analyze and provide feedback only after a user has completed an utterance.

In one embodiment, the conversational system provides a conversational interface (e.g., a text interface, a voice interface, etc.) to facilitate a communication session between a user and the automated conversational agent. The conversational interface comprises real-time feedback information representing a current state of an ongoing analysis, performed by the automated conversational agent, of an utterance-so-far. In one embodiment, the real-time feedback information comprises, but is not limited to, one or more of the following: a natural language classification for the utterance-so-far (e.g., the utterance-so-far is classified as a flight request, a hotel request, etc.), a confidence metric indicative of a degree of confidence that the conversational system either understands the utterance-so-far or can successfully execute the utterance-so-far, and one or more recognized entities included in the utterance-so-far (e.g., a location, a building, a landmark, an object type, etc.).

In one embodiment, the real-time feedback information is presented via one or more dynamic indicators that adjust/change as an utterance unfolds such as, but not limited to, one or more of the following: different text messages, different text colors, different light colors (e.g., displays a red color if the confidence metric is low, displays a green color if the confidence metric is high, etc.), different combinations/series of light pulses, different facial expressions (i.e., facial cues) on an animated robot, an avatar or a virtual three-dimensional (3D) avatar (e.g., displays a facial expression illustrating that the automated conversational agent has low understanding or does not understand the utterance-so-far if the confidence metric is low, displays a facial expression illustrating that the automated conversational agent understands the utterance-so-far if confidence metric is high, etc.), etc.

FIG. 1 illustrates a first example computing architecture for classify-as-you-go automated agent comprehension, in accordance with an embodiment of the invention. In one embodiment, classify-as-you-go automated agent comprehension is implemented on an electronic device 50 (i.e., on-device). For example, in one embodiment, the electronic device 50 comprises computation resources such as, but not limited to, one or more processor units 60 and one or more storage units 70. One or more applications execute/operate on the electronic device 50 utilizing the computation resources of the electronic device 50. For example, in one embodiment, the one or more applications on the electronic device 50 include a conversational system 200 configured to implement classify-as-you-go automated agent comprehension in which an automated conversational agent 205 analyzes an utterance of a user 30 as the utterance unfolds and provide real-time feedback as the utterance unfolds.

In one embodiment, the conversational system 200 is configured to exchange data with a remote server device 20 over a connection (e.g., a wireless connection such as a WiFi connection or a cellular data connection, a wired connection, or a combination of the two). In one embodiment, a remote server device 20 is a data source.

In one embodiment, the one or more applications on the electronic device 50 further include one or more optional software applications 90 loaded onto or downloaded to the electronic device 50.

In one embodiment, the conversational system 200 is accessed or utilized by one or more online services (e.g., AI services) hosted on a remote server device 20 and/or one or more software applications 90 operating on the electronic device 50. For example, in one embodiment, a software application 90 (e.g., a flight and airport information mobile app, a travel fare aggregator/metasearch engine, etc.) on the electronic device 50 utilizes the conversational system 200 to analyze and classify an utterance of a user 30 as the utterance unfolds.

In one embodiment, the electronic device 50 comprises any type of electronic device such as, but not limited to, a desktop computer, a smart television, a smart car, a mobile device (e.g., a smart phone, a tablet, a laptop, etc.), a wearable device (e.g., a smart watch), an Internet of Things (IoT) device, etc.

In one embodiment, the electronic device 50 comprises one or more input/output (I/O) units 80 integrated in or coupled to the electronic device 50, such as a keyboard, a keypad, a touch interface, a display screen, etc. In one embodiment, a user 30 utilizes an I/O unit 80 of the electronic device 50 to configure one or more user preferences, configure one or more parameters (e.g., a pre-defined threshold), enter text input (e.g., an utterance), etc.

In one embodiment, the electronic device 50 comprises one or more optional sensor units 85 integrated in or coupled to the electronic device 50, such as a GPS, an image sensor (e.g., a camera), a microphone, etc. In one embodiment, the conversational system 200 utilizes at least one sensor unit 85 of the electronic device 50 to capture an utterance (i.e., speech/spoken word) of a user 30. In one embodiment, the conversational system 200 utilizes at least one sensor unit 85 of the electronic device 50 to capture context information related to the user 30/the electronic device 50, such as a GPS for location data (e.g., location coordinates), an image sensor for image/video data (e.g., a live video capture or a photograph of the user 30 and/or an environment of the user 30/the electronic device 50).

Figure 2:
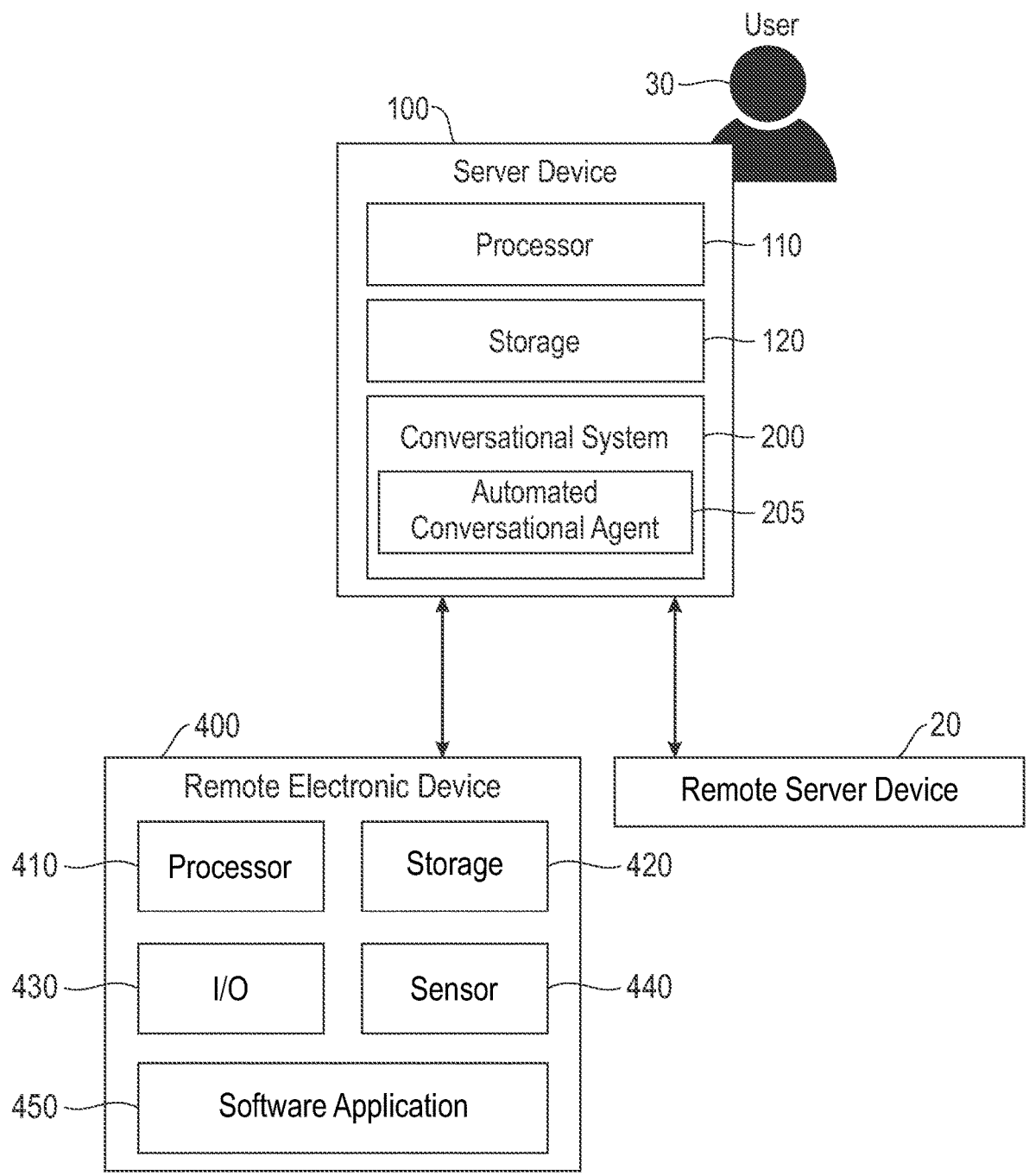
FIG. 2 illustrates a second example computing architecture for classify-as-you-go automated agent comprehension, in accordance with an embodiment of the invention.

FIG. 2 illustrates a second example computing architecture for classify-as-you-go automated agent comprehension, in accordance with an embodiment of the invention. In another embodiment, classify-as-you-go automated agent comprehension is implemented on a server device 200 (i.e., off-device). For example, in one embodiment, the server device 100 comprises computation resources such as, but not limited to, one or more processor units 110 and one or more storage units 120. One or more applications execute/operate on the server device 100 utilizing the computation resources of the server device 100. For example, in one embodiment, the one or more applications on the server device 100 include a conversational system 200 configured to implement classify-as-you-go automated agent comprehension in which an automated conversational agent 205 analyzes an utterance of a user 30 as the utterance unfolds and provide real-time feedback as the utterance unfolds.

In one embodiment, the conversational system 200 is configured to exchange data with a remote electronic device 400 and/or a remote server device 20 over a connection (e.g., a wireless connection such as a WiFi connection or a cellular data connection, a wired connection, or a combination of the two). In one embodiment, a remote electronic device 400 and/or a remote server device 20 is a data source.

In one embodiment, a remote electronic device 400 is equipped with one or more computation resources such as, but not limited to, one or more processor units 410 and one or more storage units 420. One or more applications execute/operate on a remote electronic device 400 utilizing one or more computation resources of the remote electronic device 400 such as, but not limited to, one or more software applications 450 loaded onto or downloaded to the remote electronic device 400.

In one embodiment, the conversational system 200 may be accessed or utilized by one or more online services (e.g., AI services) hosted on a remote server device 20 and/or one or more software applications 450 operating on a remote electronic device 400. For example, in one embodiment, a software application 450 (e.g., a flight and airport information mobile app, a travel fare aggregator/metasearch engine, etc.) on the remote electronic device 400 utilizes the conversational system 200 to perform an analysis of an utterance of a user 30 as the utterance unfolds.

In one embodiment, a remote electronic device 400 comprises any type of electronic device such as, but not limited to, a desktop computer, a smart television, a smart car, a mobile device (e.g., a smart phone, a tablet, a laptop, etc.), a wearable device (e.g., a smart watch), an Internet of Things (IoT) device, etc.

In one embodiment, a remote electronic device 400 comprises one or more I/O units 430 integrated in or coupled to the remote electronic device 400, such as a keyboard, a keypad, a touch interface, a display screen, etc. In one embodiment, a user 30 utilizes an I/O unit 430 of a remote electronic device 400 to configure one or more user preferences, configure one or more parameters (e.g., a pre-defined threshold), enter text input (e.g., an utterance), etc.

In one embodiment, the remote electronic device 400 comprises one or more optional sensor units 440 integrated in or coupled to the remote electronic device 400, such as a GPS, an image sensor (e.g., a camera), a microphone, etc. In one embodiment, the conversational system 200 utilizes at least one sensor unit 440 of the remote electronic device 400 to capture an utterance (i.e., speech/spoken word) of a user 30. In one embodiment, the conversational system 200 utilizes at least one sensor unit 440 of the remote electronic device 400 to capture context information related to the user 30/the remote electronic device 400, such as a GPS for location data (e.g., location coordinates), an image sensor for image/video data (e.g., a live video capture or a photograph of the user 30 and/or an environment of the user 30/the remote electronic device 400).

In one embodiment, the server device 200 is part of a cloud computing environment.

Figure 3A:
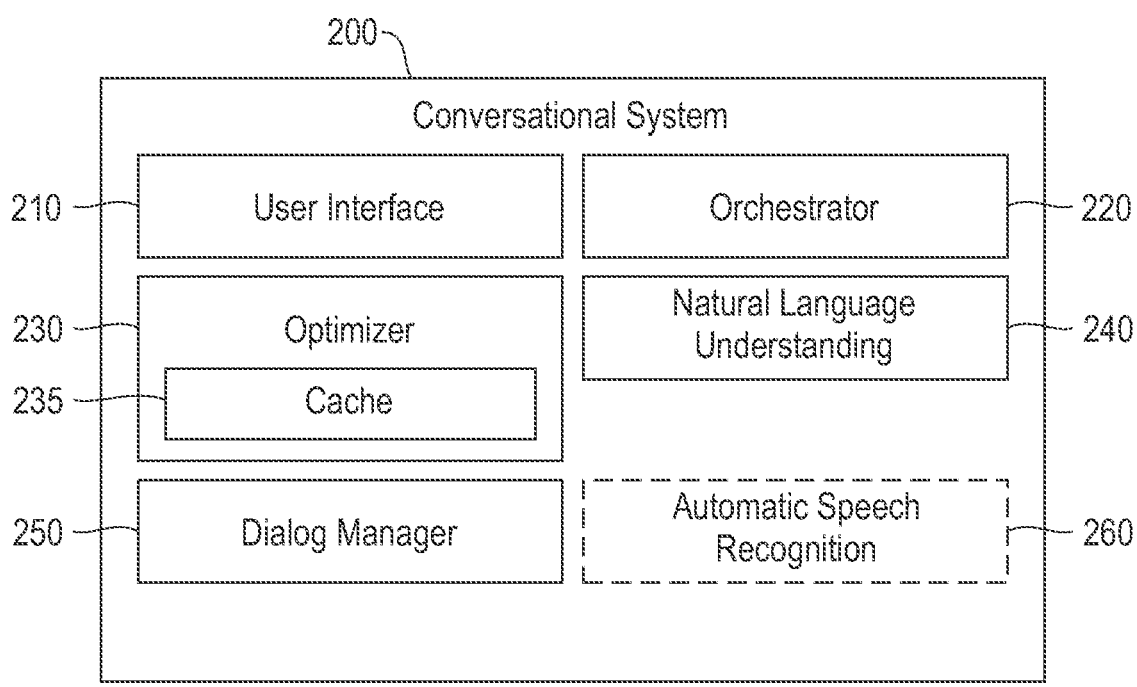
FIG. 3A illustrates an example conversational system, in accordance with an embodiment of the invention.
Figure 3B:
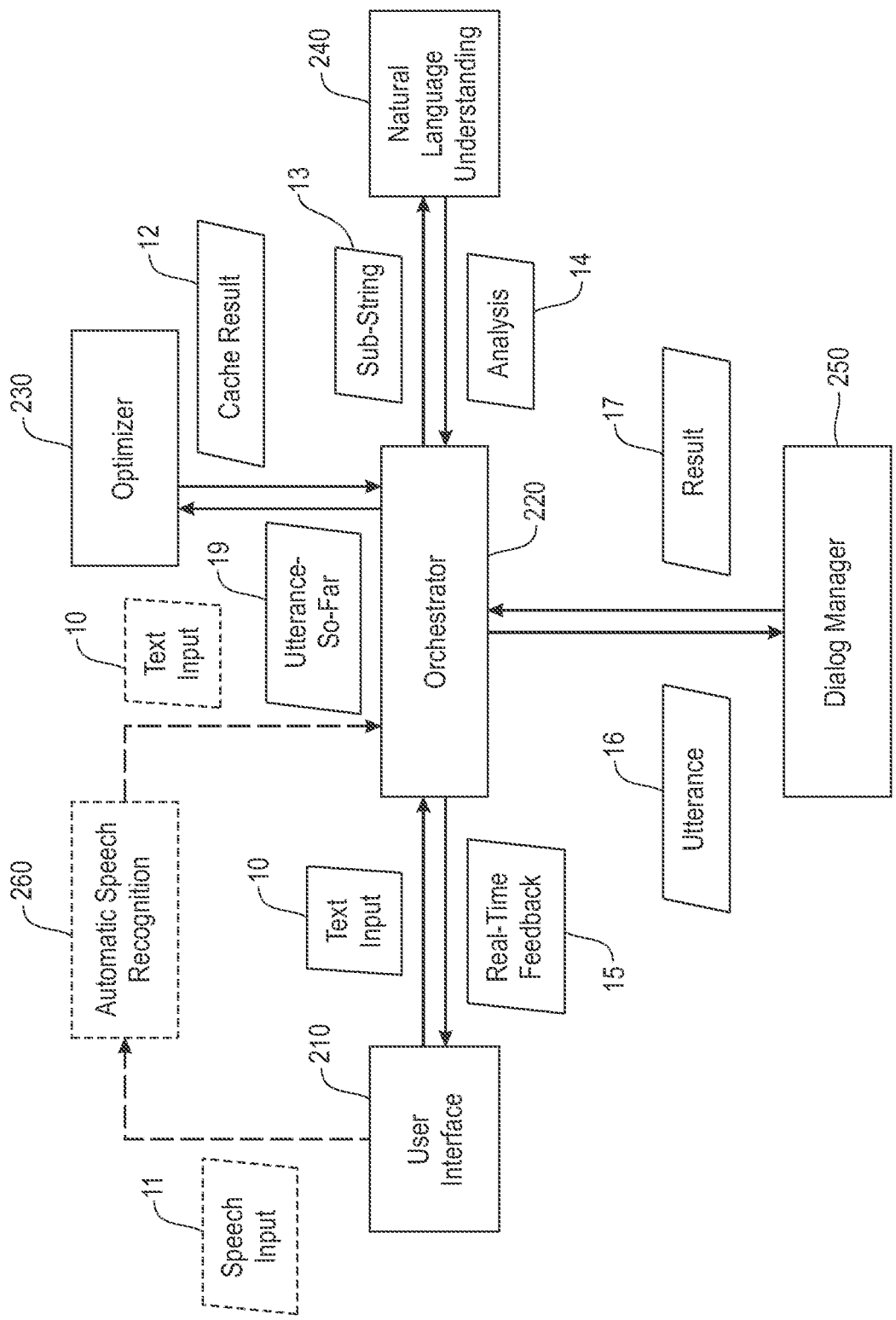
FIG. 3B illustrates an example workflow of the conversational system in FIG. 3A during a communication session between a user and an automated conversational agent implemented by the conversational system, in accordance with an embodiment of the invention.

FIG. 3A illustrates an example conversational system 200, in accordance with an embodiment of the invention. FIG. 3B illustrates an example workflow of the conversational system 200 in FIG. 3A during a communication session between a user 30 and an automated conversational agent 205 implemented by the conversational system 200, in accordance with an embodiment of the invention. In one embodiment, the conversational system 200 comprises at least one of the following components: (1) a user interface unit 210 for receiving user input (e.g., text input 10, speech input 11, etc.), (2) an orchestrator unit 220 for controlling exchange of data including user input between one or more other components of the conversational system 200, (3) an optimizer unit 230 for caching user input and corresponding information indicative of an analysis of the user input, (4) a natural language understanding (NLU) unit 240 for performing an analysis of user input, and (5) a dialog manager 250 for executing/processing user input. In one embodiment, the conversational system 200 further comprises an optional automatic speech recognition (ASR) unit 260. The classify-as-you-go automated agent comprehension implemented by the automated conversational agent 205 is performed utilizing one or more components of the conversational system 200.

In one embodiment, the conversational system 200 is implemented using a centralized computing environment. In another embodiment, the conversational system 200 is implemented using a distributed computing environment (i.e., one or more components of the conversational system 200 are remote relative to one or more other components of the conversational system 200).

In one embodiment, the user interface unit 210 is configured to generate a conversational interface (e.g., conversational interface 500 in FIG. 4, conversational interface 600 in FIG. 5) for display on an electronic device (e.g., an electronic device 50 in FIG. 1 if the conversational system 200 is on-device, or a remote electronic device 400 in FIG. 2 if the conversational system 200 is off-device) during the communication session. A conversational interface generated by the user interface unit 210 facilitates a communication session between a user 30 and the automated conversational agent 205. In one embodiment, a conversational interface generated by the user interface unit 210 comprises a graphical user interface (GUI). The user interface unit 210 is configured to generate different types of conversational interfaces such as, but not limited to, a text interface including a text input field to facilitate user input involving text input 10 (i.e., the user 30 constructs one or more utterances as text), a voice interface to facilitate user input involving speech input 11 (i.e., a user 30 constructs one or more utterances as speech/spoken word), etc.

In one embodiment, the automated conversational agent 205 provides verbal and non-verbal real-time feedback as an utterance unfolds (e.g., different verbal cues spoken by the automated conversational agent 205, different facial cues on an animated robot/avatar, etc.). For example, in one embodiment, the automated conversational agent 205 interrupts the user 30 as the utterance unfolds, or provides an appropriate response precisely at an end of a current utterance without any gap or overlap. The automated conversational agent 205 is able to infer an intent of the user 30 before the user 30 completes an utterance. Any real-time feedback provided during the construction of an utterance enables the user 30 to modify the utterance mid-course, such as increasing clarity or attractiveness of the utterance, thereby tailoring the utterance to the situation. As described in detail later herein, a conversational interface generated by the user interface unit 210 comprises one or more dynamic indicators that the automated conversational agent 205 utilizes to provide real-time feedback during construction of an utterance. For example, in one embodiment, if a conversational interface generated by the user interface unit 210 is a text interface, one or more dynamic indicators are positioned within proximity of a text input field of the text interface.

In one embodiment, the user interface unit 210 is configured to send an utterance as it unfolds to the orchestrator unit 220 word by word in real-time. Specifically, each time a user 30 provides a word during construction of an utterance, the user interface unit 210 is configured to send the word to the orchestrator unit 220 in real-time. For example, in one embodiment, if a conversational interface generated by the user interface unit 210 is a text interface, each time the user 30 enters/types a word into a text input field of the text interface, the user interface unit 210 sends the word to the orchestrator unit 220 as a text input 10 in real-time. As another example, in one embodiment, if a conversational interface generated by the user interface unit 210 is a voice interface, each time the user 30 speaks a word within proximity of a sensor unit configured to capture speech/spoken word (e.g., a sensor unit 85 in FIG. 1 if the conversational system 200 is on-device, or a sensor unit 400 in FIG. 2 if the conversational system 200 is off-device), the user interface unit 210 sends the spoken word captured by the sensor unit to the ASR unit 260 as a speech input 11 in real-time.

In one embodiment, in response to receiving a speech input 11 from the user interface unit 210, the ASR unit 260 is configured to apply a speech-to-text technique to the speech input 11 to transcribe the speech input 11 into text, and sends the resulting text to the orchestrator unit 220 as a text input 10.

In one embodiment, the optimizer unit 230 locally maintains a cache 235 (or a log) comprising one or more of the following: (1) all prior utterances constructed during the same communication session and/or one or more prior communication sessions, and (2) for each prior utterance in the cache 235, corresponding analysis information 14 including one or more results of an analysis performed on the prior utterance by the NLU unit 240 (e.g., a natural language classification, one or more recognized entities, etc.).

For expository purposes, the term "stop word" as used herein refers to a word which one or more components of the conversational system 200 (e.g., the optimizer unit 230, the orchestrator unit 220) is configured to filter out/ignore, such as, but not limited to, the word "the". In one embodiment, all stop words are removed from an utterance before the utterance is cached by the optimizer unit 230 in the cache 235.

In one embodiment, during construction of a current utterance, the orchestrator unit 220 is configured to track an utterance-so-far 19, wherein the utterance-so-far 19 includes each word provided by the user 30 as the current utterance unfolds. In one embodiment, the orchestrator unit 220 is configured to maintain the utterance-so-far 19 as a sub-string comprising each text input 10 that the orchestrator unit 220 received from the user interface unit 210 or the ASR unit 260 during the construction of the current utterance. In one embodiment, in response to receiving a text input 10 from the user interface unit 210 or the ASR unit 260, the orchestrator unit 220 updates the utterance-so-far 19 to include the text input 10 (i.e., the utterance-so-far 19 now includes the text input 10 and one or more prior text inputs 10 received, if any, during the construction of the current utterance), and sends the utterance-so-far 19 to the optimizer unit 230. In response to receiving the utterance-so-far 19 from the orchestrator unit 220, the optimizer unit 230 is configured to ignore all stop words included in the utterance-so-far 19, and check the cache 235 to determine whether there is a prior utterance in the cache 235 that matches the utterance-so-far 19 (with all stop words ignored). If the optimizer unit 230 determines that there is a prior utterance in the cache 235 that matches the utterance-so-far 19, the optimizer unit 230 retrieves cached analysis information 14 corresponding to the prior utterance from the cache 235 and returns the cached analysis information 14 to the orchestrator unit 220 as a cache result 12 for the utterance-so-far 19. If the optimizer unit 230 determines that there is no prior utterance in the cache 235 that matches the utterance-so-far 19 (with all stop words ignored), the optimizer unit 230 notifies the orchestrator unit 220 that there is no cache result for the utterance-so-far 19.

In one embodiment, the optimizer unit 230 is configured to cache utterances and corresponding analysis information across multiple users 30 and multiple communication sessions.

In one embodiment, in response to receiving a notification from the optimizer unit 230 that there is no cache result for an utterance-so-far 19, the orchestrator unit 220 invokes a call to the NLU unit 240 to analyze the utterance-so-far 19 by sending a sub-string 13 to the NLU unit 240, wherein the sub-string 13 includes the utterance-so-far 19 with all stop words removed. Utilizing the optimizer unit 230 allows the orchestrator unit 220 to reduce a number of calls made to the NLU unit 240 as the orchestrator unit 220 is triggered to make a call to the NLU unit 240 only when the orchestrator unit 220 does not receive a cache result from the optimizer unit 230, thereby improving performance (especially if the NLU unit 240 is located remotely relative to the orchestrator unit 220).

In one embodiment, in response to receiving a sub-string 13 from the orchestrator unit 220, the NLU unit 240 is configured to perform an analysis of the sub-string 13 and return corresponding analysis information 14 for the sub-string 13 to the orchestrator unit 220, wherein the corresponding analysis information 14 comprises one or more results of the analysis. In one embodiment, the NLU unit 240 is configured to perform different types of text analytics such as, but not limited to, natural language classification, entity extraction, grammatical parsing, etc. For example, in one embodiment, the NLU unit 240 is configured to apply a natural learning classifier to a sub-string 13 to classify the sub-string 13 with a natural language classification (e.g., the sub-string 13 is classified as a flight request, a hotel request, etc.), and return corresponding analysis information 14 including the natural language classification to the orchestrator unit 220. As another example, in one embodiment, the NLU unit 240 is configured to apply entity extraction to a sub-string 13 to recognize (i.e., identify and classify) one or more entities included in the sub-string 13, and return corresponding analysis information 14 including the one or more recognized entities to the orchestrator unit 220.

In one embodiment, in response to receiving corresponding analysis information 14 for a sub-string 13 from the NLU unit 240, the orchestrator unit 220 is configured to send the sub-string 13 and the corresponding analysis information 14 to the optimizer unit 230 for caching.

In one embodiment, in response to receiving analysis information for an utterance-so-far 19 (e.g., analysis information 14 from the NLU unit 240 or a cache result 12 from the optimizer unit 230), the orchestrator unit 220 is configured to generate, based on the/analysis information, corresponding real-time feedback information 15 for the utterance-so-far 19, wherein the corresponding real-time feedback information 15 represents a current state of an ongoing analysis of the utterance-so-far 19. In one embodiment, corresponding real-time feedback information 15 for an utterance-so-far 19 comprises, but is not limited to, one or more of the following: a confidence metric indicative of a degree of confidence that the automated conversational agent 205 either understands the utterance-so-far 19 or can successfully execute the utterance-so-far 19, a natural language classification (e.g., a flight request, a hotel request, etc.) for the utterance-so-far 19, one or more recognized entities (e.g., a location, a building, a landmark, an object type, etc.) included in the utterance-so-far 19, etc. In one embodiment, the orchestrator unit 220 is configured to iteratively generate real-time feedback information 15 in response to each analysis information iteratively returned by the NLU unit 240/optimizer unit 230 during the same communication session.

In one embodiment, the orchestrator unit 220 is configured to determine a corresponding confidence metric for an utterance-so-far 19 based on analysis information for the utterance-so-far 19 (e.g., analysis information 14 from the NLU unit 240 or a cache result 12 from the optimizer unit 230). For example, in one embodiment, if the analysis information includes a natural language classification (e.g., a flight request, a hotel request, etc.) for the utterance-so-far 19, the orchestrator unit 220 determines whether the automated conversational agent 205 is capable of handling the utterance-so-far 19 via the dialog manager 250. If the orchestrator unit 220 determines the automated conversational agent 205 is capable of handling the utterance-so-far 19, the orchestrator unit 220 generates real-time feedback information 15 comprising a high confidence metric indicative of a high degree of confidence that the automated conversational agent 205 can successfully execute the utterance-so-far 19. If the orchestrator unit 220 determines the automated conversational agent 205 is not capable of handling the utterance-so-far 19, the orchestrator unit 220 generates real-time feedback information 15 comprising a low confidence metric indicative of a low degree of confidence that the automated conversational agent 205 can successfully execute the utterance-so-far 19.

As another example, in one embodiment, if the analysis information includes one or more recognized entities included in the utterance-so-far 19, the orchestrator unit 220 determines whether the one or more recognized entities are within a domain of the automated conversational agent 205 (e.g., within an area of expertise that the automated conversational agent 205 is able to assist with). If the orchestrator unit 220 determines the one or more recognized entities are within a domain of the automated conversational agent 205, the orchestrator unit 220 generates real-time feedback information 15 comprising a high confidence metric indicative of a high degree of confidence that the automated conversational agent 205 understands the utterance-so-far 19. If the orchestrator unit 220 determines the one or more recognized entities are not within a domain of the automated conversational agent 205, the orchestrator unit 220 generates real-time feedback information 15 comprising a low confidence metric indicative of a low degree of confidence that the automated conversational agent 205 understands the utterance-so-far 19.

In one embodiment, in response to receiving corresponding real-time feedback information 15 for an utterance-so-far 19 from the orchestrator unit 220, the user interface unit 210 is configured to update, based on the real-time feedback information 15, a conversational interface it generated to include one or more dynamic indicators indicative of a current state of an ongoing analysis of the utterance-so-far 19. The one or more dynamic indicators provide the user 30 with real-time feedback indicative of at least one of the following: a confidence metric for the utterance-so-far 19, a natural language classification (e.g., a flight request, a hotel request, etc.) for the utterance-so-far 19, one or more recognized entities (e.g., a location, a building, a landmark, an object type, etc.) included in the utterance-so-far 19, etc. The one or more dynamic indicators enables the user 30 to see how well the automated conversational agent 205 is understanding the user 30 in real-time as the user 30 constructs the utterance, enabling the user 30 to adapt accordingly. As described in detail later herein, the one or more dynamic indicators adjust during the construction of the utterance to indicate a current level of understanding of the automated conversational agent 205. For example, in one embodiment, the automated conversational agent 205 exhibits, via the one or more dynamic indicators, a neutral level of understanding indicating that the automated conversational agent 205 is listening, and progressively exhibits one or more other levels of understanding as a number of words included in an utterance-so-far 19 increases, such as a high level of understanding indicating that the automated conversational agent 205 either understands or can successfully execute the utterance-so-far 19, or a low level of understanding indicating that that the automated conversational agent 205 either does not understand (i.e., misunderstood) or cannot successfully execute the utterance-so-far 19.

As described in detail later herein, a conversational interface generated by the user interface unit 210 includes one or more types of dynamic indicators such as, but not limited to, one or more of the following: different text messages, different text colors, different light colors (e.g., displays a red color if the confidence metric is low, displays a green color if the confidence metric is high, etc.), different combinations/series of light pulses, different facial expressions on an animated robot, an avatar or a virtual 3D avatar (e.g., displays a facial expression illustrating that the automated conversational agent has low understanding or does not understand the utterance-so-far 19 if the confidence metric is low, displays a facial expression illustrating that the automated conversational agent understands the utterance-so-far 19 if confidence metric is high, etc.), etc.

At the end of an utterance (i.e., when the user 30 completes the utterance), the orchestrator unit 220 sends a completed utterance 16 to the dialog manager 250. In one embodiment, the completed utterance 16 comprises all words (except stop words) provided by the user 30 during the construction of the current utterance. In response to receiving the completed utterance 16, the dialog manager 250 executes/processes the completed utterance 16, and generates corresponding result information 17 for the completed utterance 16, wherein the result information 17 comprises one or more results of the execution/processing. In one embodiment, the dialog manager 250 invokes one or more applications/services to execute/process the completed utterance 16 (e.g., a service hosted on a remote server device 20, a software application 90 or 450, etc.).

In one embodiment, the dialog manager 250 sends corresponding result information 17 for a completed utterance 16 directly to the user interface unit 210. In another embodiment, the dialog manager 250 sends corresponding result information 17 for a completed utterance 16 to the orchestrator unit 220 that in turn forwards the corresponding result information 17 to the user interface unit 210.

In response to receiving corresponding result information 17 for a completed utterance 16 from the dialog manager 250 or the orchestrator unit 220, the user interface unit 210 either updates a conversational interface it generated to include the corresponding results information 17 or generates a new GUI including the result information 17 for display on an electronic device (e.g., an electronic device 50 in FIG. 1 if the conversational system 200 is on-device, or a remote electronic device 400 in FIG. 2 if the conversational system 200 is off-device).

Table 3 below provides an example transcript of a communication session between a user 30 and the automated conversational agent 205.

TABLE 3

| User: | Who invented the [hard |
|---|---|
| Automated conversational agent: | [(unknown) |
| User: | Do you know about computer trivia? |
| Automated conversational agent: | I can look up hotels and flights. |

As shown in Table 3, the automated conversational agent 205 provides the user 30 with real-time feedback indicating whether the automated conversational agent 205 understands an utterance-so-far as the user 30 constructs an utterance. When an utterance-so-far comprises a sub-string "Who invented the", the automated conversational agent 205 exhibits, via one or more dynamic indicators included in a conversational interface generated by the user interface unit 210, that the automated conversational agent 205 does not understand the utterance-so-far (denoted by [(unknown) marker in the transcript), causing the user 30 to stop (denoted by [hard marker in the transcript). As further shown in Table 3, this real-time feedback enables the user 30 to adapt accordingly by constructing a new utterance. When a subsequent utterance-so-far comprises a sub-string "Do you know about computer trivia?", the automated conversational agent 205 exhibits, via one or more dynamic indicators included in the conversational interface, that the automated conversational agent 205 cannot successfully execute the subsequent utterance-so-far because the automated conversational agent 205 can only handle flight requests and hotel requests (i.e., the subsequent utterance-so-far is outside of a domain of the automated conversational agent 205).

FIG. 4 illustrates a sequence of updates to a first example conversational interface 500 generated by the conversational system 200, in accordance with one embodiment of the invention. In one embodiment, at a start of a communication session between a user 30 and the automated conversational agent 205, the user interface unit 210 generates a conversational interface 500 for display on an electronic device (e.g., an electronic device 50 in FIG. 1 if the conversational system 200 is on-device, or a remote electronic device 400 in FIG. 2 if the conversational system 200 is off-device). As shown in FIG. 4, the conversational interface 500 includes a first text message 510 introducing the automated conversational agent 205 to the user 30 and advising of how the automated conversational agent 205 is able to assist the user 30. Also shown in FIG. 4, the conversational interface 500 further includes one or more of the following dynamic indicators that adjust each time the user 30 provides a word (e.g., by entering/typing the word or speaking the word) during construction of an utterance: (1) a second text message 520 representing an utterance-so-far, (2) a status bar indicator 530 representing a confidence metric for the utterance-so-far, and (3) a third text message 540 comprising each natural language classification and recognized entity returned by the NLU unit 240 for the utterance-so-far.

For example, when the user 30 provides a first word "Show", the user interface unit 210 updates the conversational interface 500 to include: (1) the second text message 520 comprising a sub-string "Show" representing a current utterance-so-far, and (2) an updated status bar indicator 530 where a portion 531 of the status bar indicator 530 displays a first color (e.g., dark grey) indicative of a first confidence metric for the utterance-so-far.

When the user 30 provides a second word "me", the user interface unit 210 updates the conversational interface 500 to include: (1) an updated second text message 520 comprising a different sub-string "Show me" representing a current utterance-so-far, (2) an updated status bar indicator 530 where the portion 531 is extended/lengthened to reflect an increased word count of the current utterance-so-far and the portion 531 displays a second color (e.g., light grey) indicative of a second confidence metric for the current utterance-so-far, and (3) the third text message 540 comprising a natural language classification "request" for the current utterance-so-far.

When the user 30 provides a third and fourth words "flights to", the user interface unit 210 updates the conversational interface 500 to include: (1) an updated second text message 520 comprising a different sub-string "Show me flights to" representing a current utterance-so-far, (2) an updated status bar indicator 530 where the portion 531 is further extended/lengthened to reflect an increased word count of the current utterance-so-far and the portion 531 displays a third color (e.g., blue) indicative of a third confidence metric for the current utterance-so-far (e.g., the third confidence metric is higher than the first and second confidence metrics), and (3) an updated third text message 540 comprising a more granular natural language classification "request: flight" for the current utterance-so-far.

When the user 30 provides a fifth word "Rome", the user interface unit 210 updates the conversational interface 500 to include: (1) an updated second text message 520 comprising a different sub-string "Show me flights to Rome" representing a current utterance-so-far, (2) an updated status bar indicator 530 where the portion 531 is further extended/lengthened to reflect an increased word count of the current utterance-so-far (the portion 531 still displays the third color indicative of a same third confidence metric for the current utterance-so-far), and (3) an updated third text message 540 comprising the natural language classification "request: flight" and a recognized entity "Rome" for the current utterance-so-far.

When the user 30 provides a sixth and seventh words "and hotels", the user interface unit 210 updates the conversational interface 500 to include: (1) an updated second text message 520 comprising a different sub-string "Show me flights to Rome and hotels" representing a current utterance-so-far, (2) an updated status bar indicator 530 where the portion 531 is further extended/lengthened to reflect an increased word count of the current utterance-so-far (the portion 531 still displays the third color indicative of a same third confidence metric for the current utterance-so-far), and (3) an updated third text message 540 comprising the natural language classification "request: flight", a new natural language classification "request: hotels", and the recognized entity "Rome" for the current utterance-so-far.

In one embodiment, the conversational interface 500 is embodied as a voice interface (e.g., by including a microphone icon that a user 30 may select to initiate audio recording of an utterance). In another embodiment, the conversational interface 500 is embodied as a text interface (e.g., by including a text input field).

Figure 5:
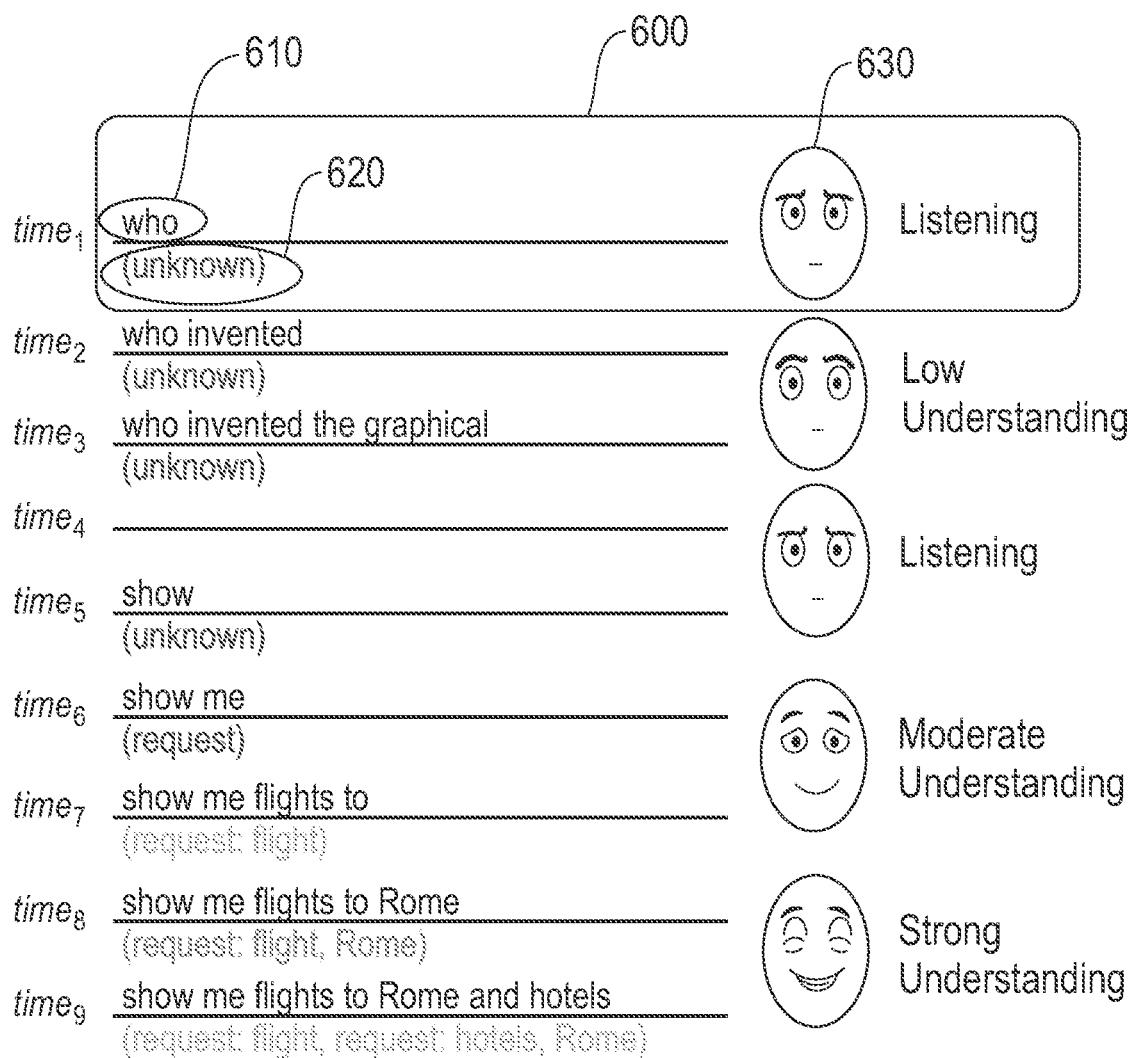
FIG. 5 illustrates a sequence of updates to a second example conversational interface generated by the conversational system, in accordance with one embodiment of the invention.

FIG. 5 illustrates a sequence of updates to a second example conversational interface 600 generated by the conversational system 200, in accordance with one embodiment of the invention. In one embodiment, at a start of a communication session between a user 30 and the automated conversational agent 205, the user interface unit 210 generates a conversational interface 600 for display on an electronic device (e.g., an electronic device 50 in FIG. 1 if the conversational system 200 is on-device, or a remote electronic device 400 in FIG. 2 if the conversational system 200 is off-device). As shown in FIG. 5, the conversational interface 600 includes one or more of the following dynamic indicators that adjust each time the user 30 provides a word (e.g., by entering/typing the word or speaking the word) during construction of an utterance: (1) a first text message 610 representing an utterance-so-far, (2) a second text message 620 comprising each natural language classification and recognized entity returned by the NLU unit 240 for the utterance-so-far, and (3) an animated avatar 630 representing a confidence metric for the utterance-so-far.

For example, at time timer when the user 30 provides a first word "who" of a first utterance, the user interface unit 210 updates the conversational interface 600 to include: (1) the first text message 610 comprising a sub-string "who" representing a current utterance-so-far, (2) the second text message 620 comprising "(unknown)" to indicate that there are no natural language classifications and recognized entities for the current utterance-so-far, where the second text message 620 is displayed in a first color (e.g., red) to indicate a first confidence metric for the current utterance-so-far, and (3) the animated avatar 630 with a first facial expression representing that the automated conversational agent 205 has a neutral level of understanding (e.g., the automated conversational agent 205 is listening/waiting for the user 30 to provide one or more words).

At time time$_1$ when the user 30 provides a second word "invented" of the first utterance, the user interface unit 210 updates the conversational interface 600 to include: (1) an updated first text message 610 comprising a different sub-string "who invented" representing a current utterance-so-far.

At time time$_3$ when the user 30 provides a third and fourth words "the graphical" of the first utterance, the user interface unit 210 updates the conversational interface 600 to include: (1) an updated first text message 610 comprising a different sub-string "who invented the graphical" representing a current utterance-so-far, and (2) an updated animated avatar 630 with a second facial expression representing that the automated conversational agent 205 has a low level of understanding (e.g., the automated conversation agent 205 has low understanding or does not understand the current utterance-so-far). In view of this real-time feedback, the user 30 stops mid-course and constructs a second utterance (i.e., a new utterance) to increase clarity.

At time time$_4$, the user interface unit 210 updates the conversational interface 600 to include: (1) no first text message 610 and no second text message 620 as the automated conversational agent 205 waits for the user 30 to begin constructing the second utterance, and (2) an updated animated avatar 630 with the first facial expression again.

At time times when the user 30 provides a first word "show" of the second utterance, the user interface unit 210 updates the conversational interface 600 to include: (1) an updated first text message 610 comprising a sub-string "show" representing a current utterance-so-far, and (2) an updated second text message 620 comprising "(unknown)" to indicate that there are no natural language classifications and recognized entities for the current utterance-so-far.

At time time$_6$ when the user 30 provides a second word "me" of the second utterance, the user interface unit 210 updates the conversational interface 600 to include: (1) an updated first text message 610 comprising a sub-string "show me" representing a current utterance-so-far, (2) an updated second text message 620 comprising "(request)" to indicate a natural language classification for the current utterance-so-far, and (3) an updated animated avatar 630 with a third facial expression representing that the automated conversational agent 205 has a moderate level of understanding.

At time time$_7$ when the user 30 provides a third and fourth words "flights to" of the second utterance, the user interface unit 210 updates the conversational interface 600 to include: (1) an updated first text message 610 comprising a sub-string "show me flights to" representing a current utterance-so-far, and (2) an updated second text message 620 comprising "(request: flight)" to indicate a more granular natural language classification for the current utterance-so-far, where the second text message 620 is displayed in a second color (e.g., orange) to indicate a second confidence metric for the current utterance-so-far.

At time time$_8$ when the user 30 provides a fifth word "Rome" of the second utterance, the user interface unit 210 updates the conversational interface 600 to include: (1) an updated first text message 610 comprising a sub-string "show me flights to Rome" representing a current utterance-so-far, (2) an updated second text message 620 comprising "(request: flight, Rome)" to indicate the natural language classification (i.e., flight request) and a recognized entity (i.e., Rome) for the current utterance-so-far, where the second text message 620 is displayed in a third color (e.g., green) to indicate a third confidence metric for the current utterance-so-far (e.g., the third confidence metric is higher than the first and second confidence metrics), and (3) an updated animated avatar 630 with a fourth facial expression representing that the automated conversational agent 205 has a strong level of understanding (e.g., the automated conversational agent 205 can successfully execute the current utterance-so-far).

At time $time_9$ when the user 30 provides a sixth and seventh words "and hotels" of the second utterance, the user interface unit 210 updates the conversational interface 600 to include: (1) an updated first text message 610 comprising a sub-string "show me flights to Rome and hotels" representing a current utterance-so-far, and (2) an updated second text message 620 comprising "(request: flight, request: hotels, Rome)" to indicate two different natural language classifications (i.e., flight request and hotel request) and the recognized entity (i.e., Rome) for the current utterance-so-far, where the second text message 620 is displayed in the second color to indicate the second confidence metric for the current utterance-so-far (e.g., the degree of confidence decreases as the automated conversational agent 205 has to handle multiple requests).

In one embodiment, the conversational interface 600 is embodied as a voice interface (e.g., by including a microphone icon that a user 30 may select to initiate audio recording of an utterance). In another embodiment, the conversational interface 600 is embodied as a text interface (e.g., by including a text input field).

Figure 6:
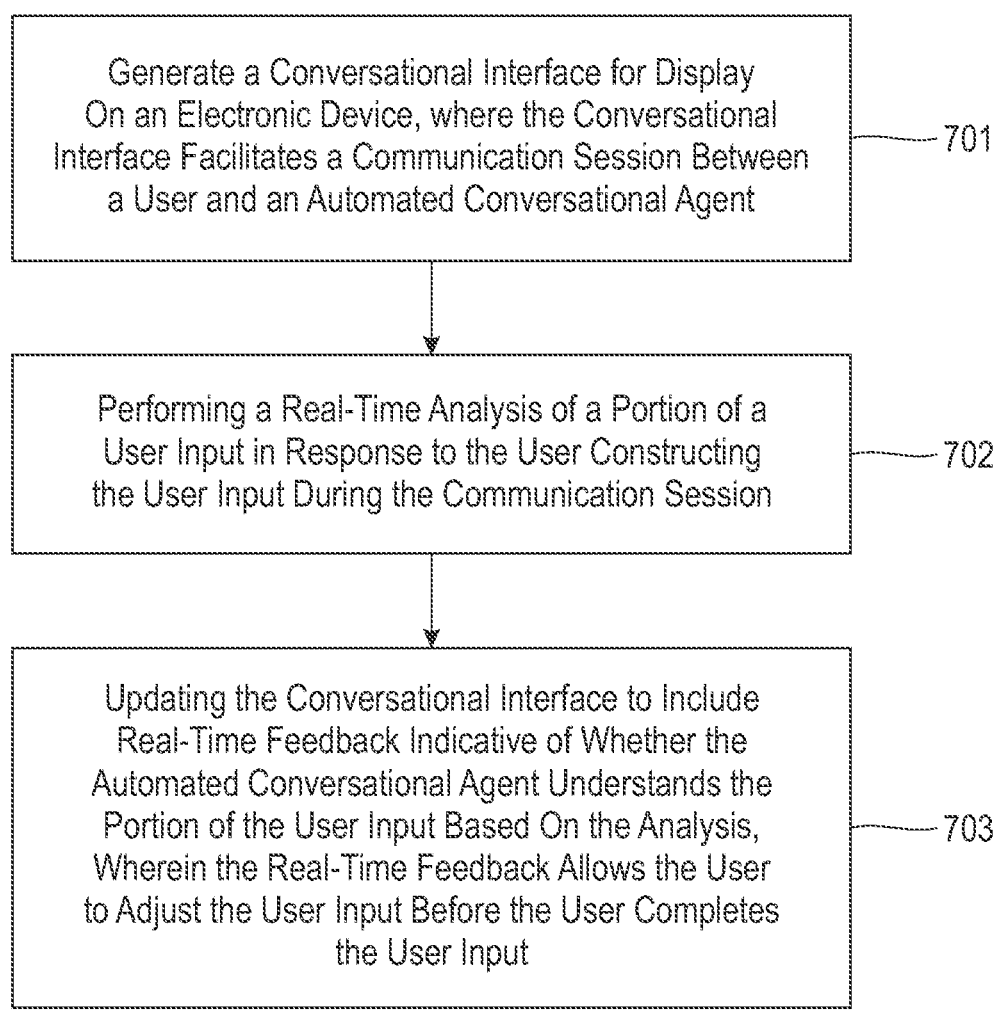
FIG. 6 is a flowchart for an example process for implementing classify-as-you-go automated agent comprehension, in accordance with an embodiment of the invention.

FIG. 6 is a flowchart for an example process 700 for implementing classify-as-you-go automated agent comprehension, in accordance with an embodiment of the invention. Process block 701 includes generating a conversational interface (e.g., conversational interface 500 in FIG. 4, conversational interface 600 in FIG. 5) for display on an electronic device (e.g., electronic device 50 in FIG. 1, electronic device 400 in FIG. 2), wherein the conversational interface facilitates a communication session between a user (e.g., user 30 in FIGS. 1-2) and an automated conversational agent (e.g., automated conversational agent 205 in FIGS. 1-2). Process block 702 includes performing real-time analysis of a portion of a user input (e.g., utterance-so-far 19 in FIG. 3B) in response to the user constructing the user input during the communication session. Process block 703 includes updating the conversational interface to include real-time feedback (e.g., real-time feedback 15 in FIG. 3B) indicative of whether the automated conversational agent understands the portion of the user input based on the analysis, wherein the real-time feedback allows the user to adjust the user input before the user completing the user input.

In one embodiment, process blocks 701-703 are performed by one or more components of the conversational system 200, such as the user interface unit 210, the orchestrator unit 220, the optimizer unit 230, and the NLU unit 240.

Figure 7:
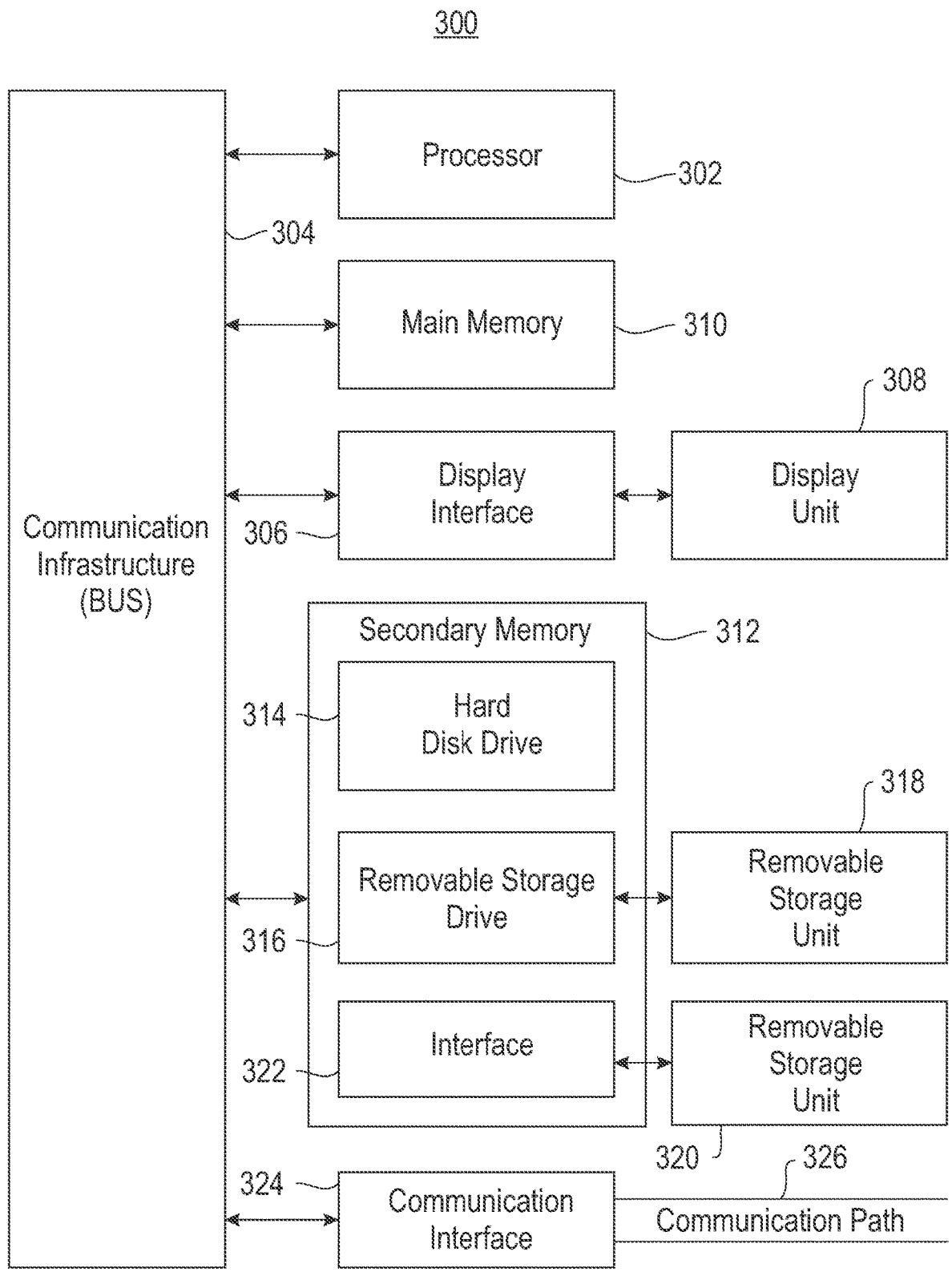
FIG. 7 is a high level block diagram showing an information processing system useful for implementing an embodiment of the present invention.

FIG. 7 is a high level block diagram showing an information processing system 300 useful for implementing one embodiment of the invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the voice communication infrastructure 304 (or from a frame buffer not shown) for display on a display unit 308. In one embodiment, the computer system also includes a main memory 310, preferably random access memory (RAM), and also includes a secondary memory 312. In one embodiment, the secondary memory 312 includes, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 includes other similar means for allowing computer programs or other instructions to be loaded into the computer system. Such means include, for example, a removable storage unit 320 and an interface 322. Examples of such means include a program package and package interface (such as that found in video game devices), a removable memory chip (such as an EPROM, or PROM) and associated socket, and other removable storage units 320 and interfaces 322, which allows software and data to be transferred from the removable storage unit 320 to the computer system.

In one embodiment, the computer system also includes a communication interface 324. Communication interface 324 allows software and data to be transferred between the computer system and external devices. In one embodiment, examples of communication interface 324 include a modem, a network interface (such as an Ethernet card), a communication port, or a PCMCIA slot and card, etc. In one embodiment, software and data transferred via communication interface 324 are in the form of signals which are, for example, electronic, electromagnetic, optical, or other signals capable of being received by communication interface 324. These signals are provided to communication interface 324 via a communication path (i.e., channel) 326. In one embodiment, this communication path 326 carries signals and is implemented using wire or cable, fiber optics, a phone line, a cellular phone link, an RF link, and/or other communication channels.

Embodiments of the present invention provide a system, a method, and/or a computer program product. In one embodiment, the computer program product includes a computer readable storage medium (or media) having computer readable program instructions thereon for causing a processor to carry out aspects of the present invention. The computer readable storage medium can be a tangible device that can retain and store instructions for use by an instruction execution device. In one embodiment, the computer readable storage medium is, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. In one embodiment, the network comprises copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In one embodiment, computer readable program instructions for carrying out operations of embodiments of the present invention are assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In one embodiment, the computer readable program instructions execute entirely on the user's computer, partly on the user's computer, as a stand-alone software package, partly on the user's computer and partly on a remote computer or entirely on the remote computer or server. In the latter scenario, in one embodiment, the remote computer is connected to the user's computer through any type of network, including a local area network (LAN) or a wide area network (WAN), or the connection is made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

In one embodiment, these computer readable program instructions are provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In one embodiment, these computer readable program instructions are also stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

In one embodiment, the computer readable program instructions are also loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, in one embodiment, each block in the flowchart or block diagrams represents a module, segment, or portion of instructions, which comprises one or more executable instructions for implementing the specified logical function(s). In some alternative implementations, the functions noted in the block occur out of the order noted in the figures. For example, in one embodiment, two blocks shown in succession are, in fact, executed substantially concurrently, or the blocks are sometimes executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

From the above description, it can be seen that embodiments of the present invention provide a system, computer program product, and method for implementing the embodiments of the invention. Embodiments of the present invention further provide a non-transitory computer-useable storage medium for implementing the embodiments of the invention. The non-transitory computer-useable storage medium has a computer-readable program, wherein the program upon being processed on a computer causes the computer to implement the steps of embodiments of the present invention described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments of the invention only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. Various embodiments of the invention were chosen and described in order to best explain the principles of the embodiments of the invention and the practical application, and to enable others of ordinary skill in the art to understand the embodiments of the invention with various modifications as are suited to the particular use contemplated.

What is claimed is:

1. A method comprising:
generating a conversational interface for display on an electronic device, wherein the conversational interface facilitates a communication session between a user and an automated conversational agent;
performing a real-time analysis of a portion of a user input in response to the user constructing the user input during the communication session; and
based on the analysis, updating the conversational interface to include real-time feedback indicative of degree of comprehension of the automated conversational agent in the portion of the user input, wherein the real-time feedback allows the user to adjust the user input before completing the user input.

2. The method of claim 1, wherein performing a real-time analysis of a portion of a user input in response to the user constructing the user input during the communication session comprises:
analyzing the portion of the user input on a word-by-word basis.

3. The method of claim 1, wherein updating the conversational interface to include real-time feedback indicative of degree of comprehension of the automated conversational agent in the portion of the user input comprises:
updating the conversational interface to include one or more textual or visual dynamic indicators.

4. The method of claim 3, wherein the one or more dynamic indicators are indicative of one or more of the following: a natural language classification for the portion of the user input, a confidence metric indicative of a degree of confidence that the automated conversational agent understands the portion of the user input or can successfully execute the portion of the user input, and one or more recognized entities included in the portion of the user input.

5. The method of claim 3, wherein the one or more dynamic indicators adjusts as a number of words included in the user input increases as the user is constructing the user input.

6. The method of claim 5, wherein the one or more dynamic indicators comprise one or more of the following: different text messages, different text colors, different light colors, different combinations of light pulses, and different facial expressions on an animated robot, an avatar or a virtual three-dimensional (3D) avatar.

7. The method of claim 5, wherein the automated conversational agent exhibits, via the one or more dynamic indicators, a neutral level of understanding indicating that the automated conversational agent is listening, and progressively exhibits one or more other levels of understanding as the number of words included in the user input increases.

8. The method of claim 7, wherein the one or more other levels of understanding comprises one or more of the following: a high level of understanding indicating that the automated conversational agent understands or can successfully execute the portion of the user input, or a low level of understanding indicating that that the automated conversational agent does not understand or cannot successfully execute the portion of the user input.

9. A system comprising:
at least one processor; and
a non-transitory processor-readable memory device storing instructions that when executed by the at least one processor causes the at least one processor to perform operations including:
generating a conversational interface for display on an electronic device, wherein the conversational interface facilitates a communication session between a user and an automated conversational agent;
performing a real-time analysis of a portion of a user input in response to the user constructing the user input during the communication session; and
based on the analysis, updating the conversational interface to include real-time feedback indicative of degree of comprehension of the automated conversational agent in the portion of the user input, wherein the real-time feedback allows the user to adjust the user input before completing the user input.

10. The system of claim 9, wherein performing a real-time analysis of a portion of a user input in response to the user constructing the user input during the communication session comprises:
analyzing the portion of the user input on a word-by-word basis.

11. The system of claim 9, wherein updating the conversational interface to include real-time feedback indicative of degree of comprehension of the automated conversational agent in the portion of the user input comprises:
updating the conversational interface to include one or more textual or visual dynamic indicators.

12. The system of claim 11, wherein the one or more dynamic indicators are indicative of one or more of the following: a natural language classification for the portion of the user input, a confidence metric indicative of a degree of confidence that the automated conversational agent understands the portion of the user input or can successfully execute the portion of the user input, and one or more recognized entities included in the portion of the user input.

13. The system of claim 11, wherein the one or more dynamic indicators adjusts as a number of words included in the user input increases as the user is constructing the user input.

14. The system of claim 13, wherein the one or more dynamic indicators comprise one or more of the following: different text messages, different text colors, different light colors, different combinations of light pulses, and different facial expressions on an animated robot, an avatar or a virtual three-dimensional (3D) avatar.

15. The system of claim 13, wherein the automated conversational agent exhibits, via the one or more dynamic indicators, a neutral level of understanding indicating that the automated conversational agent is listening, and progressively exhibits one or more other levels of understanding as the number of words included in the user input increases.

16. The system of claim 15, wherein the one or more other levels of understanding comprises one or more of the following: a high level of understanding indicating that the automated conversational agent understands or can successfully execute the portion of the user input, or a low level of understanding indicating that that the automated conversational agent does not understand or cannot successfully execute the portion of the user input.

17. A computer program product comprising a computer-readable hardware storage medium having program code embodied therewith, the program code being executable by a computer to implement a method comprising:
- generating a conversational interface for display on an electronic device, wherein the conversational interface facilitates a communication session between a user and an automated conversational agent;
- performing a real-time analysis of a portion of a user input in response to the user constructing the user input during the communication session; and
- based on the analysis, updating the conversational interface to include real-time feedback indicative of degree of comprehension of the automated conversational agent in the portion of the user input, wherein the real-time feedback allows the user to adjust the user input before completing the user input.

18. The computer program product of claim 17, wherein performing a real-time analysis of a portion of a user input in response to the user constructing the user input during the communication session comprises:
- analyzing the portion of the user input on a word-by-word basis.

19. The computer program product of claim 17, wherein updating the conversational interface to include real-time feedback indicative of degree of comprehension of the automated conversational agent in the portion of the user input comprises:
- updating the conversational interface to include one or more textual or visual dynamic indicators.

20. The computer program product of claim 19, wherein the one or more dynamic indicators are indicative of one or more of the following: a natural language classification for the portion of the user input, a confidence metric indicative of a degree of confidence that the automated conversational agent understands the portion of the user input or can successfully execute the portion of the user input, and one or more recognized entities included in the portion of the user input.

* * * * *